Feb. 8, 1927.   1,616,701
R. B. MILLARD
CONDENSER
Filed March 12, 1924   5 Sheets-Sheet 1

Inventor.
Raymond B. Millard.
His Attorney.

Inventor.
Raymond B. Millard.
his Attorney.

Feb. 8, 1927.
R. B. MILLARD
CONDENSER
Filed March 12, 1924
1,616,701
5 Sheets-Sheet 3
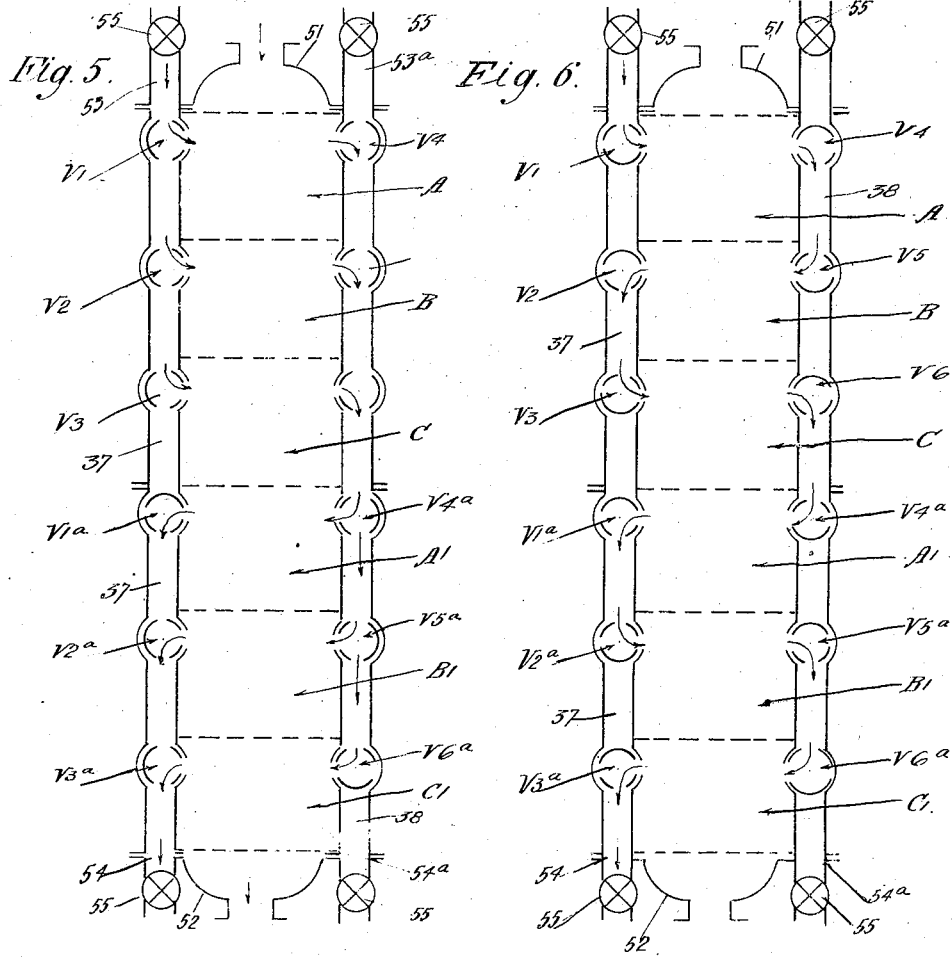
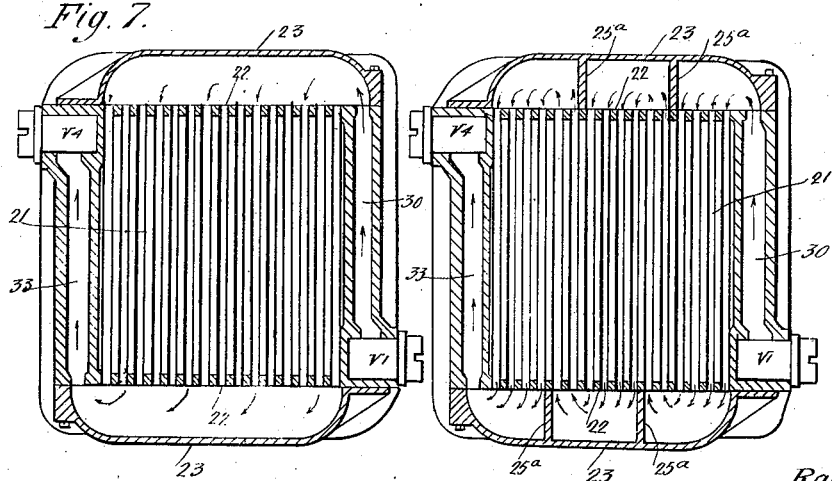
Inventor.
Raymond B. Millard
his Attorney.

Feb. 8, 1927. 1,616,701
R. B. MILLARD
CONDENSER
Filed March 12, 1924 5 Sheets-Sheet 4
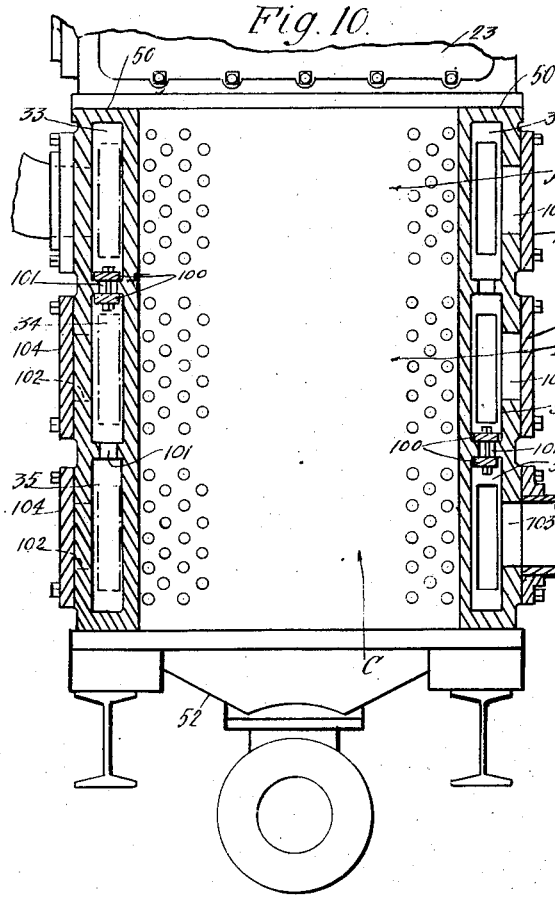
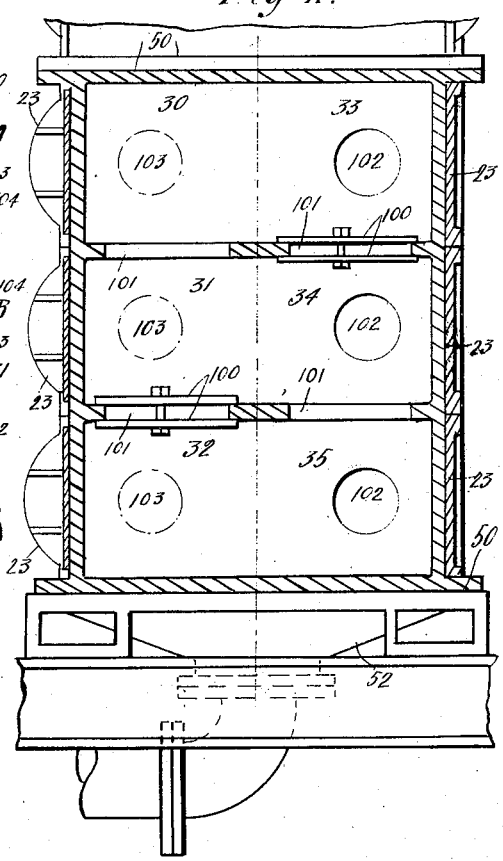
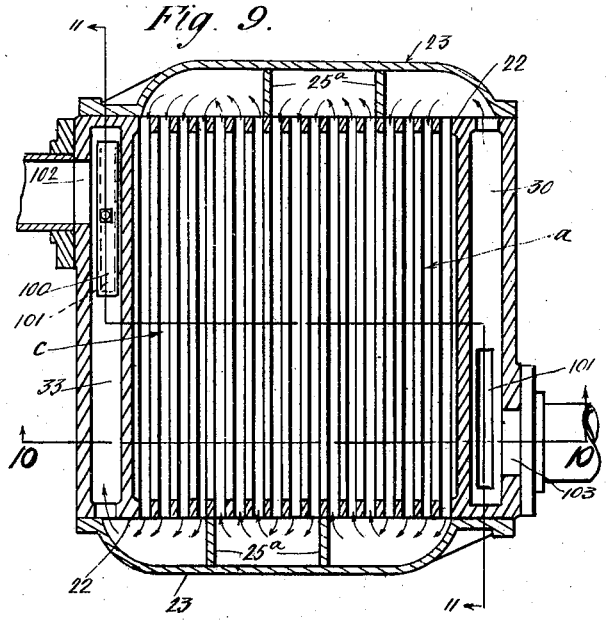
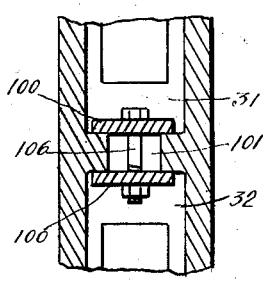
Inventor.
Raymond B. Millard.
his Attorney.

Feb. 8, 1927.
R. B. MILLARD
1,616,701
CONDENSER
Filed March 12, 1924    5 Sheets-Sheet 5
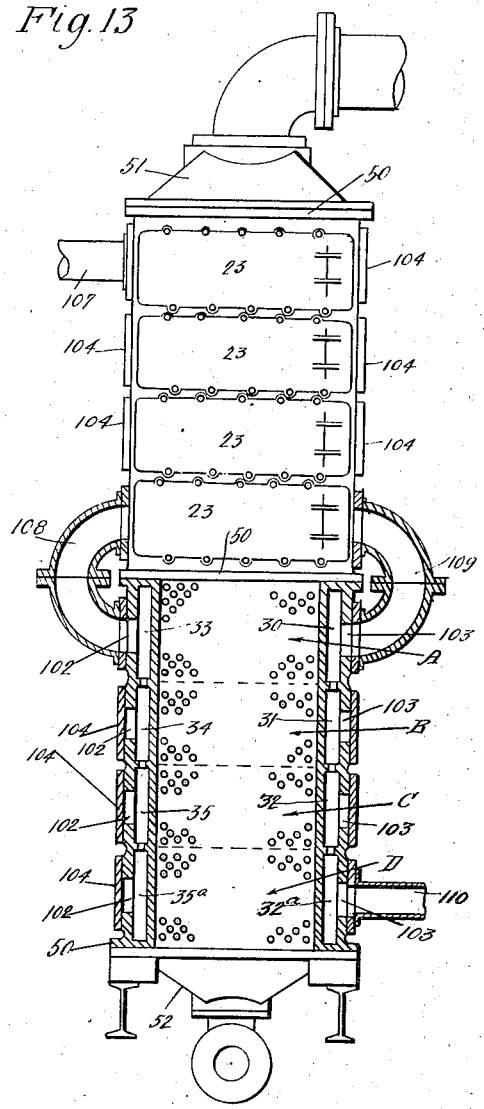
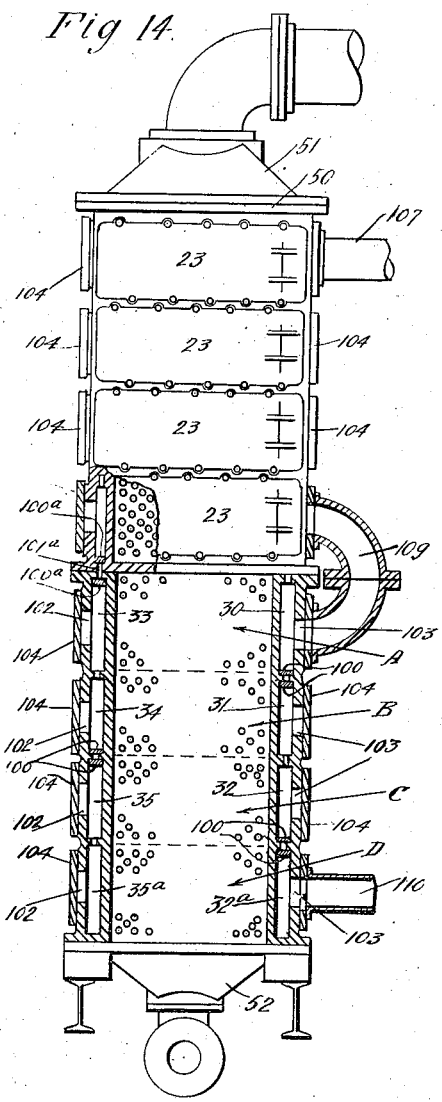
Inventor.
Raymond B. Millard.
his attorney Patented Feb. 8, 1927.

1,616,701

UNITED STATES PATENT OFFICE.

RAYMOND B. MILLARD, OF LOS ANGELES, CALIFORNIA, ASSIGNOR TO SOUTHWESTERN ENGINEERING CORPORATION, OF LOS ANGELES, CALIFORNIA, A CORPORATION OF DELAWARE.

CONDENSER.

Application filed March 12, 1924. Serial No. 698,780.

This invention relates to condensers, and, in some of its aspects, relates more particularly to improvements in that type of condenser that is the subject matter of U. S. Letters Patent #1,427,611, Harry Edward MacCamy, dated August 29th, 1922. In that patent there is explained a condenser in which a plurality of tube units are individually connected to the cooling fluid supply; in which chambered end cover plates are used to form connections between adjacent tubes, and in which the supply of cooling fluid to the several tube units may be individually controlled or cut off and the tubes of any one or more units may be uncovered for inspection or repair without putting the remaining units out of operation.

There are several important objects of my present invention, but most of them will be best understood from the following detailed description of a specific and illustrative embodiment of my invention. But I may preliminarily mention here that in my improved condenser I not only provide an arrangement whereby the several units may be individually controlled, both for controlling the amount of fluid passing through but also for shutting them off entirely independently of other units, for inspection or repair; but I also provide such valvular controlling means as to enable the coupling of the several units either in series relationship, in parallel relationship, or in combination of both series and parallel, and I also locate this controlling means, and the passages through which the fluid passes on its way to the tube units, in the walls of the condenser itself; so that the condenser mechanism is then all self contained, and further, so that these passages at one and the same time perform not only the function of distributing the cooling fluid to the various tube units but also the function of cooling the internal walls of the condenser to keep them, as nearly as may be at the same temperature as the tubes themselves. And I also provide a condenser structure that may be built up of duplicate sections to any desired size and cooling capacity.

Further objects, and the accomplishments of the invention, will be best understood from the following detailed description of a preferred form of device illustrative of the invention explained in the following description, reference for this purpose being had to the accompanying drawings in which:

Figs. 5 and 6 are diagrams illustrative of different valvular positions to place the tube units in different relations;

Figs. 7 and 8 are diagrams showing a modified arrangement of cover plates.

Fig. 9 is a horizontal section similar to Fig. 1 showing a modified structure;

Fig. 10 is a vertical section on line 10—10 of Fig. 9;

Fig. 11 is a vertical section on line 11—11 of Fig. 9;

Fig. 12 is an enlarged sectional detail of a part of Fig. 10; and

Figs. 13 and 14 are more or less diagrammatic views showing how condenser sections of the modified form may be connected up.

Figure 2:
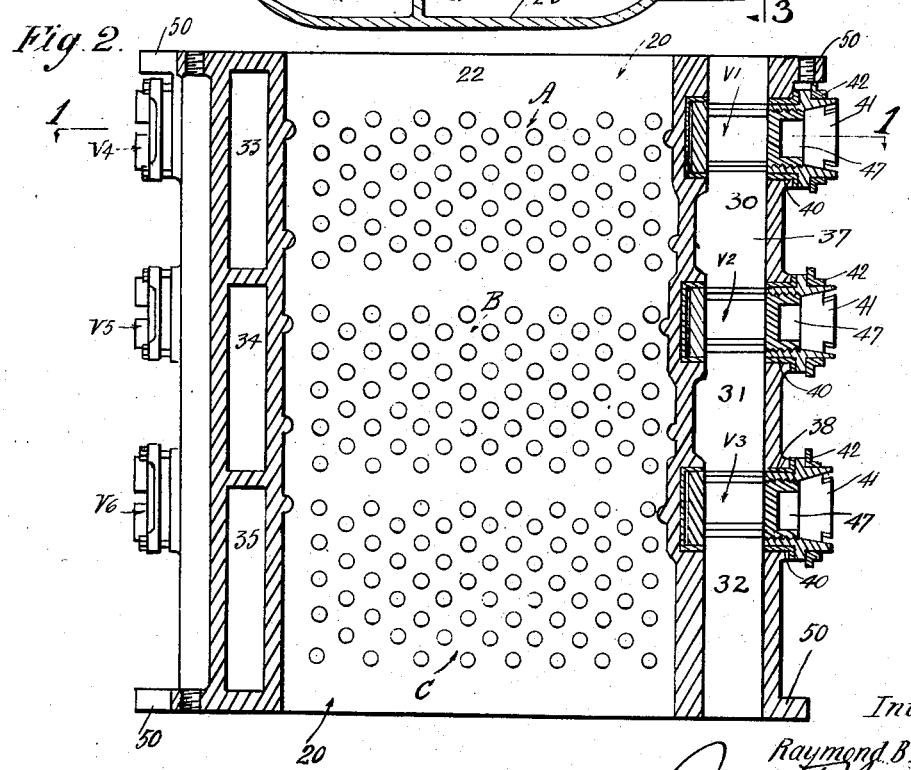
Fig. 2 is a vertical section on line 2—2 of Fig. 1.

In the form of condenser herein illustrated I show the particulars of a single section. A complete condenser may be built up of any desired number of these sections connected together, as will be explained. Each condenser section may be formed with a cast body, more or less rectangular in plan and having a vapor passage therethrough as illustrated at 20. The condensers are usually installed so that this passage 20 is vertical; but the installation may be in any other position, as for instance to make passage 20 horizontal. Across this passage 20 I place a plurality of tubes 21 arranged in units designated in Figs. 2 and 3 by the letters A, B, and C. It will be understood that the number of units in each condenser section may be varied; in the present form of the device I have chosen to have three tube units in each section. These tubes extend between and are set at their ends in end walls 22 of the condenser section. The relation of the tubes to each other may be as desired, but I prefer to place them in staggered relation as illustrated.

Figure 1:
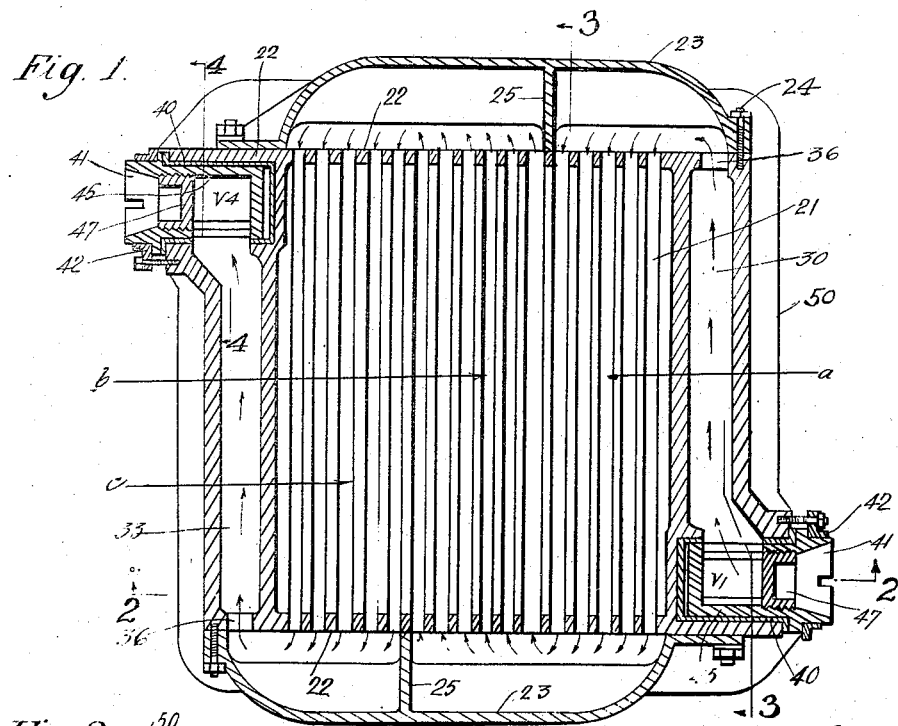
Figure 1 is a horizontal section taken as indicated by line 1—1 on Fig. 2.
Figure 3:
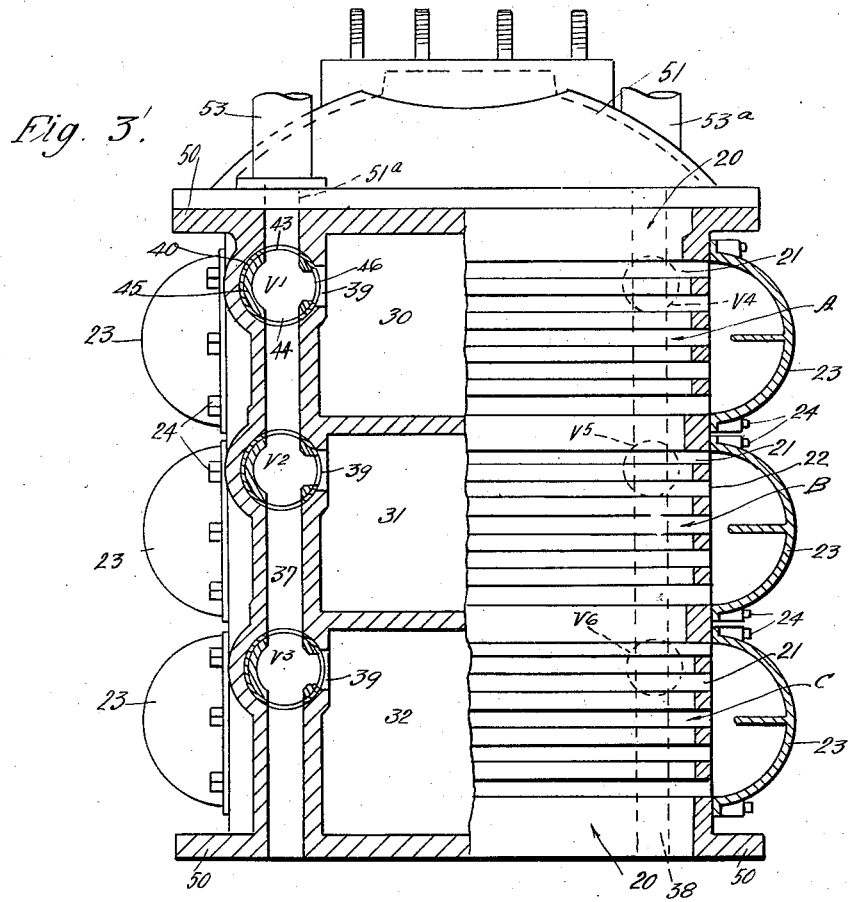
Fig. 3 is a vertical section on line 3—3 of Fig. 1.

On the outer faces of the two end walls 22 are secured cover plates 23, three in number at each end wall, each cover plate covering the ends of the tubes of one unit as will be understood from an inspection of Figs. 1 and 3. These cover plates are secured by bolts or cap screws 24 so that any one or more of the cover plates may be removed without disturbing the others. In the preferred arrangement herein shown I provide each cover plate with an internal cross wall 25 as best shown in Fig. 1, for the purpose of dividing each unit of tubes into, in this particular case, three tube divisions through which the cooling fluid will flow in series. These three tube divisions, for convenience of explanation, are designated in Fig. 1 by the letters $a$, $b$ and $c$. It will appear hereinafter how, by changing the number of cross walls 25 in the cover plates I may divide each tube unit into more or less divisions, but for the present I will base my explanation on the arrangement here illustrated.

In each side wall of the condenser section there are cast three cooling fluid distributing passages designated 30, 31, and 32 on the inlet side and 33, 34, and 35 at the outlet side of the particular section here illustrated. I may here say however, that the condenser is symmetrical in design and that either side may be the inlet or outlet side as desired. At two opposite corners of the condenser section these distributing passages communicate, as shown at 36 in Fig. 1, each with one end passage under a cover plate; and at the other two corners of the section there are two vertical inlet and outlet passages 37 and 38 which communicate, respectively, through openings 39 with the distributing passages 30, 31, 32 and 33, 34, 35. Each of these openings 39 is controlled by a valve seated in the body of the condenser. The valves at that side of the condenser that I have here chosen to regard as the inlet side are designated as $V^1$, $V^2$, and $V^3$ while those at the outlet side are designated $V^4$, $V^5$, and $V^6$. These valves may be described as being three-way valves, and I will explain their preferred structure. All of them may be alike. Each valve is set in a stationary lining 40 made of a suitable material to give good fit and good wear with the valve plug 45. Each valve plug has an exteriorly projecting head 41 so that it may be turned to any desired position, and the plug is held in place by a ring 42. Each valve plug has in it three openings 43, 44 and 46, adapted to register with passages 37 or 38 and with openings 39. Each valve plug is hollow as illustrated, and a screw plug 47 closes the outer end. This screw plug is provided so that a pipe connection may be led independently to any condenser section or sections, or to any unit of any section as will be hereinafter described.

Each condenser section is provided at top and bottom with flanges 50, by means of which several sections may be placed one on top the other so that their vapor passages 20 then form one continuous passage and so that their inlet and outlet cooling fluid passages 37 and 38 also form continuous passages. To these flanges are also connected the top and bottom caps, for instance as illustrated at 51 in Fig. 3. This cap 51 is shown diagrammatically in Figs. 5 and 6, as are also bottom caps 52. A pipe 53 is shown connected to cap 51, and communicating with inlet passage 37 through a passage 51$^a$ in the cap.

In a typical installation two or more condenser sections may be mounted one above the other so that vapors may pass down through the complete condenser. The cooling fluid may be introduced through pipe 53 into inlet passage 37; and with valves $V^1$, $V^2$ and $V^3$ in the positions illustrated in Fig. 3 this cooling fluid will be distributed into distributing passages 30, 31 and 32 of the uppermost condenser section and thence into the three end passages under cover plates 23 with which these passages 30, 31 and 32 communicate. The fluid that passes into each of these end passages will then be directed by cross wall 25 into and through tube division "$a$" from which the cooling fluid flows into the corresponding end passage under a cover plate at the other end of the condenser section and is then returned by cross wall 25 into and through tube division "$b$". Thence the cooling fluid flows into the second compartment of the first mentioned end passage from which it flows into and through the tube division "$c$" back to the second mentioned end passage and thence through opening 36 into the corresponding one of distributing passages 33, 34 and 35 and to the valve $V^4$, $V^5$ or $V^6$, as the case may be. Valves $V^4$, $V^5$ and $V^6$ are set in the positions shown in Fig. 4. It will thus be seen that the cooling fluid that enters through passage 37 is, for each condenser section, divided into three streams; and each stream is independent of the others in its flow through the wall passages and the tube units and both valves, until it is returned to the common outlet passage 38.

Figure 4:
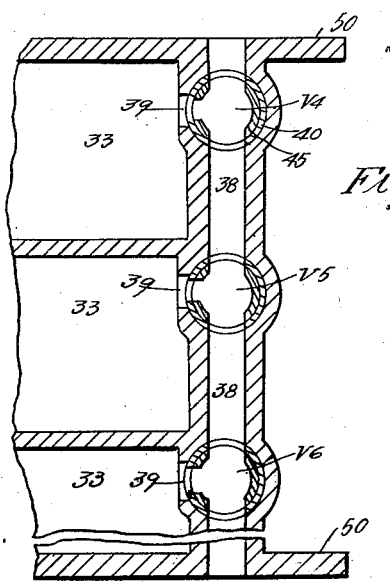
Fig. 4 is a vertical section on line 4—4 of Fig. 1.

If all the inlet and outlet valves of all the superposed condenser sections are set in the positions shown in Figs. 3 and 4 it will be apparent that the fluid entering passage 37 will be distributed in parallel through all the tube units of all the condenser sections and will emerge through outlet passage 38. Thus all of the tube units are arranged in parallel relation. In this arrangement the distribution of fluid to the various tube units may be controlled by adjusting the various valves so as to keep the flow through the units uniform and equal in quantity, or, if desired, to put more fluid through certain units than through others. The cooling fluid may (as shown in Fig. 3) be taken from passage 38 by a pipe 53ᵃ connected to cap 51 like pipe 53.

Fig. 6 shows in diagram a valvular arrangement for putting the fluid through all of the tube units in series. Here valve $V^1$, of the upper section has been turned to direct all of the fluid from pipe 53 through tube unit A; valve $V^4$ has been turned to then direct all the fluid from unit A down passage 38 to valve $V^5$ which has been turned to direct the whole flow through tube unit B. Then valve $V^2$ has been turned to direct the whole flow down through passage 37 to valve $V^3$ where the flow is directed through tube unit C. The valves of the other sections are likewise correspondingly adjusted, as will be readily understood from the diagram, so that the whole flow finally comes out through pipe 54. In this arrangement all the tube units are in series relation.

I can also make any desired combination of series and parallel relationship. For instance, in Fig. 5 I show diagrammatically such an arrangement in which the tube units A, B and C of the upper condenser section are in parallel relationship to each other, as are also the tube units $A^1$, $B^1$, and $C^1$, of the lower condenser section; but these two sets of units are arranged in series relationship to each other. This arrangement is effected by leaving the valves of the upper condenser section in the first described position (position of Figs. 3 and 4), and also leaving all the valves of the lower section in that same position except that the valve $V^{1a}$ of the lower section has been turned to block off passage 37 so that fluid coming down the upper part of passage 37 in the upper section cannot flow past valve $V^{1a}$; and except that valve $V^{6a}$ of the lower section is turned to block off passage 38 below it. Thus all the fluid introduced through pipe 53 is distributed by valves $V^1$, $V^2$, and $V^3$, in parallel through tube units A, B, and C and then flows through valves $V^4$, $V^5$, and $V^6$ into passage 38 and then down passage 38 and through valves $V^{4a}$, $V^{5a}$, and $V^{6a}$ through tube units $A^1$, $B^1$, and $C^1$ in parallel and thence through valves $V^{1a}$, $V^{2a}$, and $V^{3a}$, again into passage 37 of the lower condenser section and thence out through pipe 54.

It will be seen that in these two last mentioned arrangements the lower part of passage 37 becomes a final outlet passage, and so outlet pipe 54 is located under passage 37. In the first described arrangement, with all tube units of all condenser elements in parallel, the passage 38 is the final outlet passage, leading to a corresponding outlet pipe 53ᶜ as shown in Fig. 3, or to a pipe 54ᵃ connecting with the bottom of passage 38 in the position shown in Figs. 5 and 6. In order to facilitate changes in cooling fluid circulation in any given condenser setup, I may provide the inlet pipe at 53ᵃ which communicates with passage 38 at the top and the outlet pipe at 54ᵃ which communicates with passage 38 at the bottom. All the inlet and outlet pipes may be suitably controlled by valves as indicated in the diagrams at 55.

If it is desired, in any condenser set up involving one or more condenser sections, to obtain individual cooling fluid connection to one or more units or sections, this may be easily had by connections made through any one or more of the valves. This is quite often desirable in a condenser where the vapors are initially at a higher temperature than water boiling point or where it is desired to preheat oils, for instance before putting them through a process of cracking or distillation. In such a case it may be desired, for instance, to use oil as a cooling medium in the upper, hotter parts of the condenser and to use water in the lower cooler parts. Suppose for instance, it is desired to cool the upper condenser sections of the diagrams with oil and lower condenser sections with water. This may be done by taking the plugs out of valves $V^3$ and $V^{1a}$, or $V^6$ and $V^{4a}$, and connecting pipes into the valves. One or both of these valves are then turned to the position shown for the valve $V^{1a}$ in Fig. 5 so as to block off the passage 37 or 38 as the case may be, thus effectually separating the cooling fluid system of one portion of the condenser from the other.

I have described each tube unit as divided into three divisions by cross walls 25 of the cover plates, these several divisions being thus placed in series relationship. In the diagram of Fig. 7 I show cover plates without any cross wall and all the tubes of a unit are thus placed in parallel relation. In the diagram of Fig. 8 I show cover plates equipped each with two cross walls 25ᵃ, with the result that the tubes of the unit are divided into five divisions. It will thus be readily seen how the tube units may be divided into any odd number of divisions with a slight variation of the structure herein explained; and the number of divisions may be increased if desired, although I prefer to have a number of tubes in each division so that there is always a number of tubes in parallel relation, as the friction to flow of the cooling fluid is thus cut down and also as I find the temperature of the various tubes may be more uniformly maintained by this arrangement.

In Figs. 9 to 14 I have shown a modified condenser structure in which the controlling valves and passages 37 and 38 are eliminated and stop plates 100 are used to close openings 101 between the distributing passages 30, 31, 32, and 33, 34, and 35. In this form I may also provide connection openings 102 and 103 to the several passages 30 to 35, as illustrated, which openings may be closed by plates 104 when not actually used for pipe connections. Otherwise the structure is as before described. Openings 101 make communications between adjacent passages 30, 31, etc. and plates 100 may be secured in place to close these openings, by bolts 106, as is clearly indicated in Fig. 12. By taking out all these plates, the passages 30, 31, 32 at one side, and 33, 34, 35 at the other side of each condenser section can be intercommunicated so that cooling fluid introduced by a pipe as at 107 (Fig. 13) will then flow in parallel through all the tube units to the passages 33, 34, 35 and thence out through a pipe connected to any outlet opening 103. In a multi-section condenser, as in Fig. 13, U-pipes 108 and 109 may be used to connect passage 35 of an upper section to passage 33 of a lower section, and passage 32 of an upper section to passage 30 of a lower section. The plates 100 of the lower section being likewise removed, the flow of fluid is in parallel through the tube units throughout the whole condenser, the fluid emerging at an outlet pipe 110. (In Figs. 13 and 14 I have shown condenser sections each containing four tube units.)

By properly arranging the stop plates 100 the flow may be in series through the several tube units of all sections. This is illustrated in Fig. 14 and it will also be apparent how the plates may be arranged to get a combination of series and parallel flow.

It will be noted that in the forms of Figs. 1-8 I have shown cooling fluid interconnections between the several sections by means of making the inlet and outlet passages in adjacent sections register with each other. In the form of Figs. 9-14, where openings 102, 103 are provided for each tube unit it is convenient to interconnect the sections by pipes 108, 109; but it will be understood that plate controlled openings 101ª may be just as well used. For instance, this is illustrated in Fig. 14 where the opening 101ª at the left is closed by plates 100ª and that at the right is open.

It will be unnecessary now to point out particularly the many advantages of my condenser structure, as those have been made apparent from the description of structure and operation. But I may further draw attention to one feature of the device. The condenser section is so made that a complete condenser set up may be made of any desired size by adding condenser sections end to end. In this arrangement the longitudinal passages all register with each other to form continuous passages, and, because of the symmetrical construction of each section, it is immaterial which passages are used as inlet passages and which are used as outlet passages. And, as heretofore explained, in any given condenser set up, at different times and with different circuits of the cooling fluid, either one of these passages may be either inlet or outlet passage for any particular condenser section.

Having described a preferred form of my invention I claim:

1. A unitary condenser section, embodying a body with a vapor passage therethrough from end to end and with a plurality of cooling fluid passages in its wall, a plurality of independent tube units in the vapor passage, each tube unit connecting with a wall passage, the body wall also having a common passage communicable with all the first mentioned passages, and valvular means in the body wall to control communication of the common passage with the first mentioned passages.

2. In a device of the character described, a condenser section comprising a body with a passage therethrough from end to end, cooling tubes in the passage, and passage means communicating with the two ends of the cooling tubes embodying an inlet and an outlet cooling fluid passage extending through the section from end to end.

3. In a device of the character described, a condenser section, comprising a body with a passage therethrough from end to end, cooling tubes in the passage, and passage means communicating with the two ends of the cooling tubes embodying an inlet and an outlet cooling fluid passage extending through the section from end to end, and a three-way valve in each passage to control the fluid flowing therethrough.

4. In a device of the character described, a condenser section comprising a body with a vapor passage therethrough from end to end, cooling tubes in the passage, cooling fluid passage means communicating with the two ends of the tubes and embodying two distributing passages in the body wall and an inlet and an outlet passage in the body wall extending from end to end of the body, and a valve in each of said last mentioned passages controlling the flow of fluid to and from the distributing passages.

5. In a device of the character described, a condenser section comprising a body having a vapor passage therethrough from end to end, a plurality of tube units extending across the vapor passage, two sets of cooling fluid distributing passages in the body wall, the passages in each set being equal in number to the number of tube units and each passage connecting with an end of a tube unit; the body wall also having inlet and outlet passages for cooling fluid extending from end to end of the body and communicating individually with the distributing passages, and valves set in said inlet and outlet passages to control said communications.

6. A condenser embodying a plurality of condenser sections placed together end to end and each comprising a body with a vapor passage therethrough from end to end and with two passages for cooling fluid extending through the body wall from end to end, the several endwise passages of the sections registering to form continuous passages through the complete condenser; cooling tubes in each section extending across the vapor passage, the ends of the tubes communicating with the two cooling fluid passages in each section, and means in each section controlling said communications.

7. A condenser embodying a plurality of condenser sections placed together end to end and each comprising a body with a vapor passage therethrough from end to end and with an inlet and an outlet passage for cooling fluid extending through the body wall from end to end, the several endwise passages of the sections registering to form continuous passages through the complete condenser; cooling tubes in each section extending across the vapor passage, distributing passages in the body wall connecting with the ends of the tubes and communicating with the inlet and outlet cooling fluid passages in each section, and three-way valves located in said inlet and outlet passages at said communications with the distributing passages and adapted to control said communications and to divert the fluid flow either to said communications or along said inlet and outlet passages.

8. A condenser section, comprising a body with a vapor passage therethrough from end to end, cooling tubes extending across said passage, cooling fluid inlet and outlet passages in the walls of the body and extending from end to end, distributing passages in said walls communicating with the inlet and outlet passages and with the tubes, and valves in the inlet and outlet passages controlling flow of fluid between said inlet and outlet passages and the distributing passages, said inlet and outlet passages and their valves being substantially duplicates of each other.

9. A condenser section, comprising a body with a vapor passage therethrough from end to end, cooling tubes extending across said passage, cooling fluid inlet and outlet passages in the walls of the body and extending from end to end, distributing passages in said walls communicating with the inlet and outlet passages and with the tubes, and valves in said inlet and outlet passages controlling flow of fluid between said inlet and outlet passages and the distributing passages, said inlet and outlet passages and their valves being substantially duplicates of each other, and being symmetrically arranged with reference to a longitudinal central axis through the body.

10. A condenser section, comprising a body with a vapor passage therethrough from end to end, tubes extending across the vapor passage, cooling fluid inlet and outlet passages in the walls of the body at opposite corners and extending from end to end of the body, two opposite side walls in the body containing cooling fluid passages communicating respectively with the inlet and outlet passages and means connecting said side wall passages with the opposite ends of the tube.

11. A condenser section, comprising a body with a vapor passage therethrough, cooling tubes extending across the passage and divided into units, two opposite side walls of the body having passages corresponding in number to the number of tube units, means connecting each passage with one tube unit, and means whereby the several passages in one wall may be interconnected or isolated from each other.

12. A condenser section, comprising a body with a vapor passage therethrough, cooling tubes extending across the passage and divided into units, two opposite side walls of the body having passages corresponding in number to the number of tube units, means connecting each passage with one tube unit, said means being formed by end cover plates for each tube unit connecting with the end of the corresponding wall passage and means of inter-communication between the several passages in each wall.

13. A condenser section, comprising a body with a longitudinal vapor passage therethrough, cooling tubes extending across the passage, and passage means in association with the body communicating with opposite ends of the cooling tubes and embodying an inlet and an outlet, said inlet and outlet being arranged on the body symmetrically with reference to the longitudinal axis of the vapor passage.

14. A condenser section, comprising a body with a vapor passage therethrough, cooling tubes extending across the passage and divided into units, two opposite side walls of the body having passages corresponding in number to the number of tube units and each passage communicating with one tube unit, means whereby the several passages in one wall may be interconnected or isolated from each other, and means for making cooling fluid pipe connections to any isolated passage independently of the remaining passages.

In witness that I claim the foregoing I have hereunto subscribed my name this 29 day of February 1924.

RAYMOND B. MILLARD.